United States Patent [19]

Day, III et al.

[11] 4,387,368

[45] Jun. 7, 1983

[54] TELEMETRY SYSTEM FOR CENTRIFUGAL WATER CHILLING SYSTEMS

[75] Inventors: Arthur R. Day, III, Mechanicsburg; Fred McMenamy, York, both of Pa.

[73] Assignee: Borg-Warner Corporation, Chicago, Ill.

[21] Appl. No.: 212,299

[22] Filed: Dec. 3, 1980

[51] Int. Cl.³ ............................................. G08B 19/00
[52] U.S. Cl. ..................................... 340/539; 340/517;
340/521; 340/870.09; 340/870.11; 340/870.16;
62/129; 62/540
[58] Field of Search ............... 340/539, 500, 501, 506,
340/508, 517, 521, 522, 525, 531–534, 870.01,
870.07, 870.09, 870.11, 870.12, 870.13, 870.16,
870.17, 870.22; 179/5 R, 5 P; 370/53; 62/540,
125, 126, 129; 417/1, 19, 32

[56] References Cited

U.S. PATENT DOCUMENTS

| | | | |
|---|---|---|---|
| 3,744,043 | 7/1973 | Walden et al. | 340/521 |
| 4,149,155 | 4/1979 | Kishi et al. | 340/500 |
| 4,151,725 | 5/1979 | Kountz et al. | 49/10 |
| 4,163,216 | 7/1979 | Arpino | 340/870.13 |
| 4,168,494 | 9/1979 | Hummel et al. | 340/521 |

Primary Examiner—John W. Caldwell, Sr.
Assistant Examiner—Donnie L. Crosland
Attorney, Agent, or Firm—James E. Tracy

[57] ABSTRACT

A telemetry system for reporting the status of a number of physical parameters occurring during operation of industrial equipment, such as the monitoring of refrigeration/air conditioning safety controls and anticipatory refrigeration controls. Activation of the safety or anticipatory controls generate electrical signals to activate a four input alarm transmitter, which automatically dials a pre-programmed telephone number and reports the status of the various inputs to a special monitor receiver at a remote location. An interface board is coupled to the safety and anticipatory controls, and multiplexes the signals therefrom into four transmitter inputs. An indicator panel connected to the interface board provides a maintained visual indication of which input(s) have caused a transmission. The anticipatory controls are set to trip before the safety controls, which latter controls effect shut-down of the system, and provide anticipatory signals warning of impending system problems.

17 Claims, 5 Drawing Figures

FIG_3A_

FIG. 3C.

TELEMETRY SYSTEM FOR CENTRIFUGAL WATER CHILLING SYSTEMS

BACKGROUND OF THE INVENTION

A. Field of the Invention

This invention relates in general to telemetry systems, and, in particular, a telemetry system for reporting actual or impending malfunctions of industrial equipment.

More specifically, but without restriction to the particular use which is shown and described, the invention relates to a telemetry system for reporting the status of a number of safety control and anticipatory control conditions of equipment being monitored during operation. One exemplary use of the invention of the application involves the monitoring of the operation of centrifugal water chilling systems and other refrigeration/air conditioning equipment.

In the operation of many types of industrial equipment and machinery, critical physical parameters are constantly or randomly evaluated to monitor performance of the system. In many situations, physical sensors are used to determine whether critical conditions deviate from an operative norm and may cause automatic shut-down of the equipment or transmit warning signals to operating personnel to effect whatever corrective action is needed. One type of system in which conditions are typically surveyed during operation is in conventional cooling systems, such as are used to control the internal environment of buildings and the like. For example, centrifugal water chilling systems often employ monitoring controls which act to shut-down the system for reasons of safety and protection of the equipment, if certain operative conditions critically deviate from acceptable norms. Such safety shut-down controls may generally be responsive to such factors as the thermal or pressure conditions in the evaporator or condenser of the chiller or to mechanical considerations associated with the compressor.

Prior art monitoring techniques employed in cooling systems and the like have been deficient in providing a truly effective telemetry system which is capable of automatically transmitting a coded identifying message over a telephone line and reporting the status of the various inputs to a special monitor receiver located at a remote location, either before or after actual shut-down. The transmission of anticipatory signals warning of impending system problems prior to actual shut-down is a particularly important consideration in cooling systems of buildings. The prompt transmittal of a warning message to a central station to alert service personnel offers the opportunity that the impending malfunction in the system be rectified before uneconomical and inconvenient termination of operation of the cooling system actually occurs in response to its safety control. Prior art telemetry systems have not satisfactorily been capable of transmitting coded messages to a remote monitoring station to warn that a condition in a cooling system is deviating from an acceptable level and that malfunctioning of the equipment is likely. Thus, known monitoring systems have not optimally provided constant surveilance of cooling equipment with the capability of promptly transmitting warning signals along with specific identification data to a remote location and permit responsive action to be taken to correct any problem which is detected.

B. Description of the Prior Art

An example of a centrifugal water chilling system with which the invention of the application may be used is disclosed in U.S. Pat. No. 4,151,725 to Kunz.

SUMMARY OF THE INVENTION

It is, therefore, an object of the present invention to provide a telemetry system to report the status of a number of operative parameters of industrial equipment.

Another object of this invention is to provide a telemetry system for monitoring equipment to transmit a coded message to a remote location and warn of possible and actual malfunction of the equipment.

A further object of this invention is to provide a telemetry system to provide an anticipatory coded message to a remote monitoring station prior to actual safety shut-down of the equipment which is being monitored.

A still further object of this invention is to transmit a coded message relating to physical conditions of a cooling system automatically over a telephone line to a remote monitor receiver.

Still another object of the present invention is to monitor safety and anticipatory controls of a cooling system and transmit signals to a remote station warning of actual and impending malfunction(s).

A still further object is to advise service personnel of the source of actual and potential malfunctions in a cooling system.

These and other objects are attained in accordance with the present invention wherein there is provided a telemetry system recording the status of a number of safety control parameters and anticipatory control parameters of industrial equipment, such as in refrigeration/air conditioning systems. A four input transmitter, when activated, automatically dials a pre-programmed telephone number and reports the status of the various inputs to a special monitor receiver in a remote location. An interface circuit board is utilized to accept line voltage signals from a plurality of safety and anticipatory controls, and multiplex them into four transmitter inputs. An indicator panel connected to the interface board provides visual indication identifying which input has caused the transmission. The anticipatory controls are set to trip before system shut-down safety controls are activated to permit repair and service of the equipment prior to cessation of its operation.

DESCRIPTION OF THE DRAWINGS

Further objects of the invention, together with additional features contributing thereto and advantages accruing therefrom, will be apparent from the following detailed description of the invention which is shown in the accompanying drawings with like reference numerals indicating corresponding parts throughout, wherein.

DESCRIPTION OF A PREFERRED EMBODIMENT

For convenience of illustration, the telemetry system of the present invention is disclosed in connection with a centrifugal water chilling system (not shown) of the general type disclosed in U.S. Pat. No. 4,151,725. However, it should be understood that it is within the scope of the invention to employ the telemetry system with other conventional refrigeration/air condition systems, or any other industrial equipment, in which it is desirable to monitor one or more operative parameters and report malfunctions.

Figure 1:
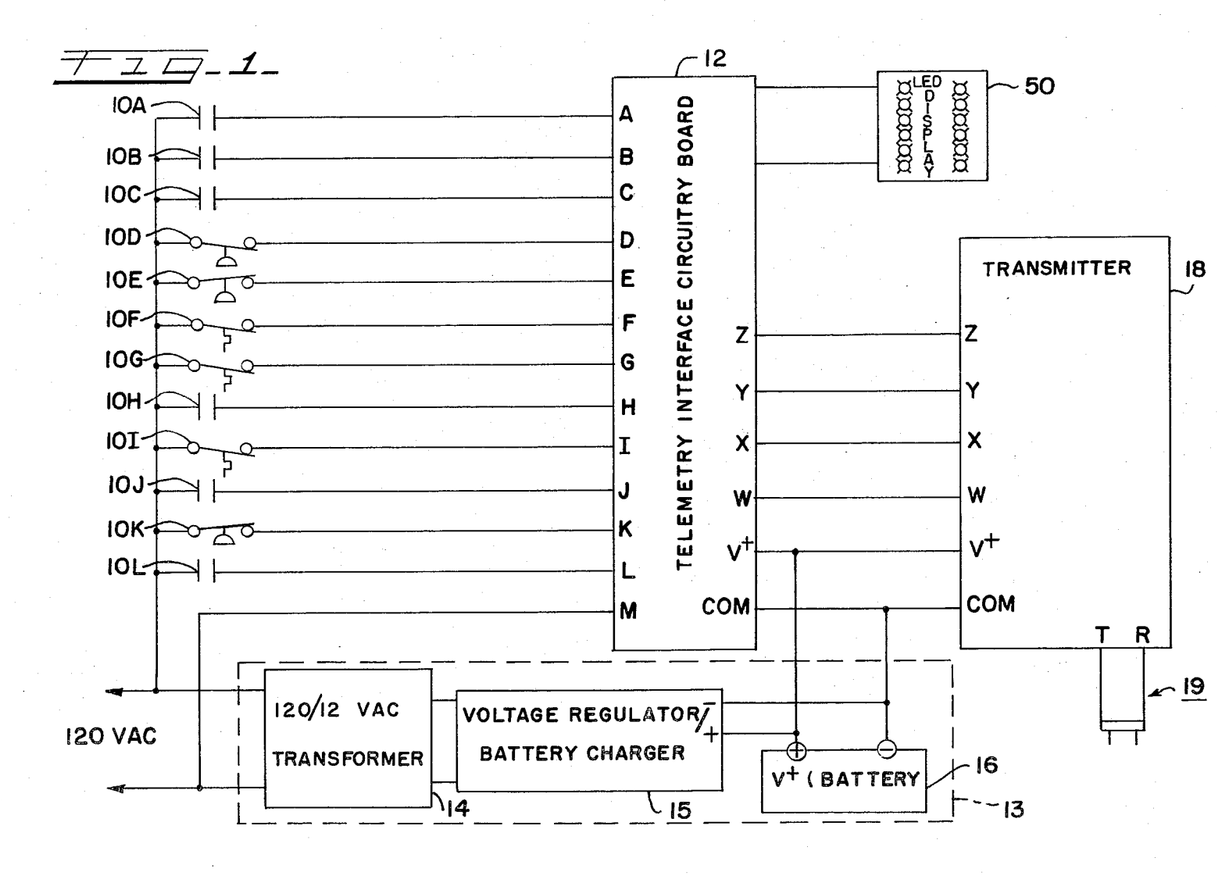
FIG. 1 is a block diagram illustrating the telemetry system of the present invention for reporting the status of a number of physical parameters occuring during the operation of industrial equipment.

Referring now to FIG. 1, there is shown a block diagram of the telemetry system of the invention for reporting the status of a selected number of safety controls and anticipatory refrigeration controls of conventional refrigeration/air conditioning machinery, such as, for example, a centrifugal water chilling system. The telemetry system is generally designated by reference numeral 1 and comprises an interface circuitry board 12 having inputs A-M, a plurality of safety/anticipatory controls 10A-10L; a LED display 50; a telemetry transmitter 18; and a DC power supply 13. The power supply 13 is adapted to be coupled to a 120 VAC power supply (not shown) and includes an isolation transformer 14, a battery charger/voltage regulator 15, and a rechargable battery 16. The power supply 13 supplies a +6 VDC (V+) to the telemetry interface circuitry board 12 and the transmitter unit 18. The battery 16 is maintained in a state of constant charge by the battery charger 15 and is capable of providing suitable operating power to the telemetry system when the normal power supply fails.

The transmitter 18 is a conventional system for transmitting information over a telephone line 19 and the like and includes four input terminals Z, Y, X and W and power terminals V+ and COM, which are adapted to be coupled to a source of electrical potential, such as power source 13. Each input Z, Y, X and W corresponds to a predetermined message code programmed in the transmitter 18. Upon receipt of a signal at input Z, Y, X or W, the transmitter is programmed to dial a pre-determined telephone number and to transmit an alarm or message code in association with the energized input, and an identifiable account number over telephone line 19. Thus, a coded message identifying cooling equipment problems and the location of the telemetry system is transmitted to a central station having a special monitor receiver (not shown). The monitor receiver may be at a remote location and capable of monitoring a number of separate telemetry systems 1 simultaneously. Although any suitable transmitter, which is capable of performing the foregoing functions, may be used in connection with the invention, transmitter 18 may comprise a commercially available unit marketed by the Sentry Technology Division of Baker Industries and identified as a Wells Fargo Alarm Services Model 141a/141c Digital Transmitter.

The telemetry system of the invention is capable of monitoring a plurality of predetermined process control functions of a cooling system or other industrial equipment. As shown in FIG. 1 for purposes of illustration, telemetry system 1 is disclosed specifically as being coupled to twelve safety/anticipatory electrical contacts 10A-10L, which correspond to the following conditions of the centrifugal water chilling system:

Contact 10A-chiller control panel safeties;
Contact 10B-motor controller safeties;
Contact 10C-excess purging signal;
Contact 10D-high condenser pressure;
Contact 10E-low evaporator pressure;
Contact 10F-high discharge temperature;
Contact 10G-high ambient temperature;
Contact 10H-spare input;
Contact 10I-high oil temperature;
Contact 10J-spare input;
Contact 10K-low oil pressure; and
Contact 10L-compressor "start" signal.

Each of the input safety/anticipatory control contacts 10A-10L is operatively coupled to the 120 VAC power supply and is responsive to a particular physical control parameter of the type listed above, which are typically monitored in known centrifugal water cooling systems.

Upon the occurence of any one of the above-listed conditions, the particular contact associated with that condition will close to complete a circuit. Such a contact closure will cause current to pass from the 120 VAC power supply to the corresponding inputs A-L on the interface circuitry board 12. Interface circuitry board 12 is energized by the application of a 120 VAC signal on one or more of its inputs A-L. For example, if the pressure in the condenser of the water chilling system exceeds an acceptable level, switch contact 10D will close. Current then passes from the 120 VAC supply through contact 10D to input D of the telemetry interface circuitry board 12. The circuit is grounded through point M on interface circuitry board 12 and back to the 120 VAC supply. Upon a 120 VAC signal being applied to input D, interface circuitry board 12 is then energized for operation. Details of interface circuitry board 12 and its function will be hereinafter described.

In general, input A is operatively associated with known control panel safety shut-down contacts of the chiller of the system in the form of pressure and temperature operated switches, by which such parameters as high condenser pressure, low evaporator pressure, and high discharge pressure are monitored. In the event that one of these shut-down safety contacts (not shown) is activated due to an unsuitable preset level being detected and causing the cooling system to shut down for reasons of safety and protection of the equipment, the contact 10a will close, and a voltage signal applied to input A of the interface circuitry board 12. Application of this signal at input A energizes the interface circuitry 12 and generates an output at terminal Z of the interface circuitry board 12. The output Z of the interface circuitry board 12 is transmitted to input Z of the transmitter 18. The transmitter 18 is then activated, and as previously stated, is pre-programmed to dial a preselected telephone number and transmit a code "Z" message along with a unique identification number associated with the transmitter 18.

Simultaneously, an LED indicator will be activated on the LED display 50 which is located at the site of the telemetry system 1 to provide a visual indication of which input (A) has caused the transmission. In this instance, the LED corresponding to input A will be energized to indicate that one of the chiller control panel safety shut-down contacts has been activated. At the receiver site, the message is automatically recorded and then decoded to reveal the exact location and nature of the chilling system problem. The information transmitted will enable service personnel to promptly proceed to the site of the water chilling system with prior knowledge of the source of the problem in the cooling equipment.

Input B is operatively connected to motor controller shutdown safeties (not shown) associated with mechanical components of the cooling system, including solid state motor controller of the compressor. Mechanical motor controller shut-down contacts are responsive to such conditions as ambient temperature within the controller enclosure, loss of phase, phase reversal or under voltage. In the event that one of the motor controller safety shut-down contacts is activated and the cooling system is automatically shut-down, switch contacts 10B will close thereby allowing current to flow through contact 10B. A signal is then applied to input B of the interface circuitry board 12 and transmitted to input Y of the transmitter 18 enabling the transmitter to dial the pre-programmed telephone number and transmit a code "Y" message. An LED indicator associated with input B will be activated to indicate a motor controller malfunction in the same manner previously described in connection with a code "Z" message.

The LED indicators of LED display 50 that are activated in connection with the receipt of a signal on input A or input B of the interface board circuitry 12 are red. The energization of a red LED at the site of the telemetry system 1 is an indication that operation of the cooling system has automatically been shut-down. When the system is repaired and restarted, the LED indicators associated with the input A and input B, respectively, are automatically extinguished.

The anticipatory refrigeration control channel inputs correspond to inputs C, D, E, and F of the interface board circuitry 12. The parameters, which are monitored on the anticipatory refrigeration channel controls may be directed to excessive purging (indicating leaks or contamination of the refrigeration circuit of the cooling system), high condenser pressure, high discharge temperature and low evaporator pressure, respectively. The latter three controls are similar to those employed in chiller control panel to close contact 10A, but are set to trip before the safety contacts are activated. Upon occurrence of any of these conditions, the corresponding contacts 10C, 10D, 10E, or 10F will be energized thereby allowing current to flow to the input associated with the closed switch contact.

Upon receipt of one or more signals at inputs C-F, interface circuitry board 12 multiplexes such one or more inputs to generate an output X. Output X is applied to input X of the transmitter 18, thereby causing the transmission of a code "X" message and transmitter identification number. The receipt of a code "X" message at the receiver site indicates that one of the chiller refrigeration circuit parameters is out of its normal bounds, but has not yet caused the chiller to completely shut-down. Receipt of this code "X" message will allow service personnel ample time to proceed to the site of the water chilling system and correct the situation before a safety shut-down occurs.

Simultaneously, with the transmission of an output X, an LED indicator is also energized on the LED display 50 corresponding to the input (C-F) which caused the generation of the output X. Unlike the red LED indicators associated with inputs A and B, the inputs C, D, E, and F are associated with a unique yellow LED indicator to indicate which input (C-F) energized the transmitter 18. The energization of indicators associated with inputs C-F are maintained by the interface circuitry board 12 until they are manually reset at the transmitter site. This is necessary to eliminate any question about which input (C-F) caused the transmission due to the signal multiplexing scheme employed.

The interface board circuitry 12 also includes inputs G, H, I, J, K, and L which correspond to mechanical anticipatory channel inputs. The parameters which may be monitored on the mechanical anticipatory channel controls are high ambient temperature, spare input, high oil temperature, spare input, low oil pressure, and compressor "start" signal, respectively. The pair of spare inputs may be utilized to monitor any other condition or auxiliary mechanical function as needed. Inputs G-K are also anticipatory sensor controls and are utilized to provide a warning signal to allow corrective action to be taken before a system shut-down can occur.

Upon occurence of any of the conditions associated with inputs G-K, the corresponding switch contact will close, passing the current therethrough and allowing the application of voltage at the appropriate input (G-L). The inputs G-K are multiplexed on the interface circuitry board 12 and generate an output W which is applied to the input W of the transmitter 18 for transmission of a code "W" message and transmitter identification number. The anticipatory sensors used with inputs G, I, and K are similar to the mechanical safeties associated with inputs A and B, but are set to be tripped prior to activation of safeties terminating operation of the system.

As previously discussed with regard to inputs C-F, upon activation of any of the inputs G-K, a unique yellow LED indicator is energized on the LED display 50 corresponding to the input G-K on the interface circuitry board 12 that was energized. Again, each of these LED indicators are maintained in an energized state, until they are manually reset at the transmitter site after the system has been repaired.

While activation of inputs G-J will generate an output from the interface circuitry board 12 in a manner similar to that described with regard to inputs C-F, the activation of input K will not generate an output from the interface circuitry board 12 until input L has been energized for over 102 seconds. Input K is used to monitor the lubrication oil pressure. Input L is connected to the compressor start signal. Upon startup of the compressor motor, there are fluctuations in the normal oil pressure. The 102 second delay is utilized to eliminate nuisance transmissions by the interface circuitry board 12 caused by the normal oil pressure fluctuations during start up. Thus, the interface circuitry board 12 will not generate an output based upon an activation of input K until a time delay of 102 seconds after input L has been activated.

In the event that the water chilling system is performing under optimum conditions, a green LED will be energized on the LED display 50. This green LED will be energized to indicate that all channel controls of the water chilling system are operating satisfactorily. However, when a signal is applied to any one of the inputs A-K, the green LED will be automatically extinguished.

Figure 2:
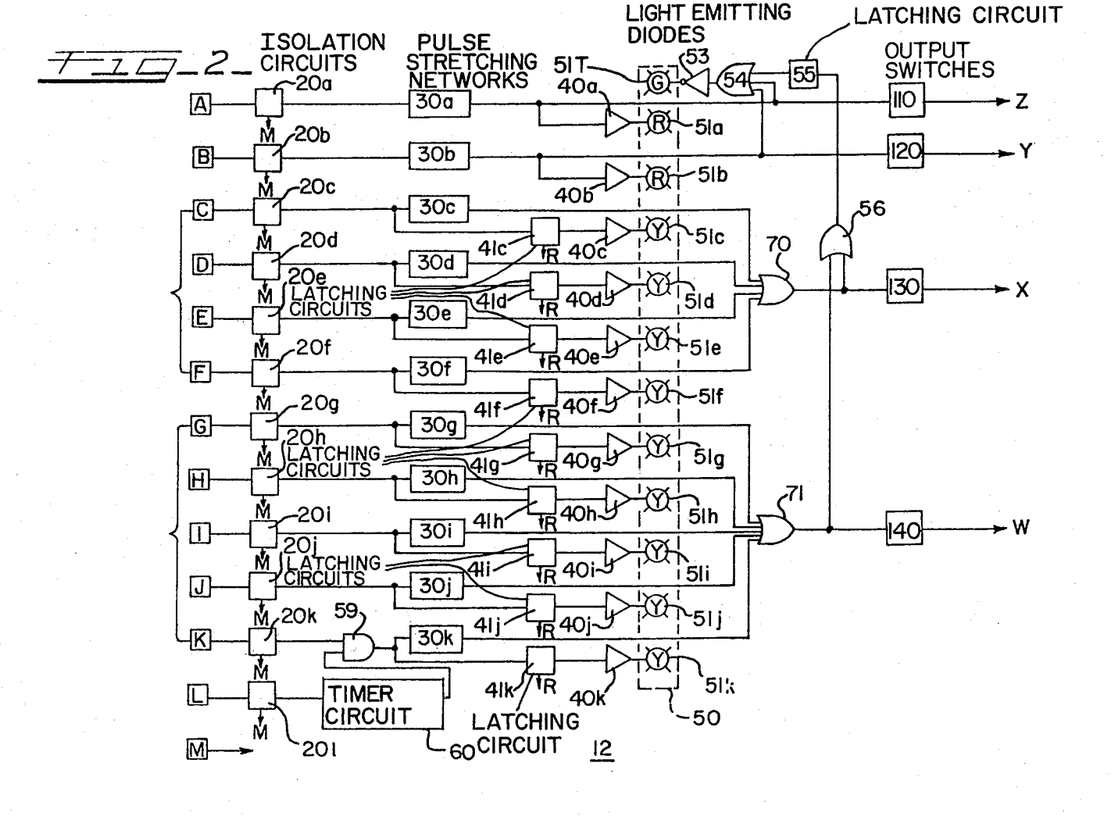
FIG. 2 is a logic block diagram illustrating the telemetry interface circuitry board of FIG. 1.

Referring now to FIGS. 2 and 3a, 3b and 3c, taken together, there is shown a block diagram of the interface circuitry board 12 and a detailed electrical schematic of the interface circuitry board 12, respectively. Referring first to FIG. 2, the interface circuitry board 12 includes twelve input isolation circuits 20A-20L. The isolation circuits are of identical design and are utilized to isolate the incoming line voltage signals generated upon closure of the respective contact and the application of a voltage to inputs A–K of the interface circuitry board 12 (not shown in FIG. 1). The isolation circuits 20A–20L are utilized to isolate the line voltages from the low voltage logic and telephone circuits utilized in the telemetry system 1.

Figure 3A:
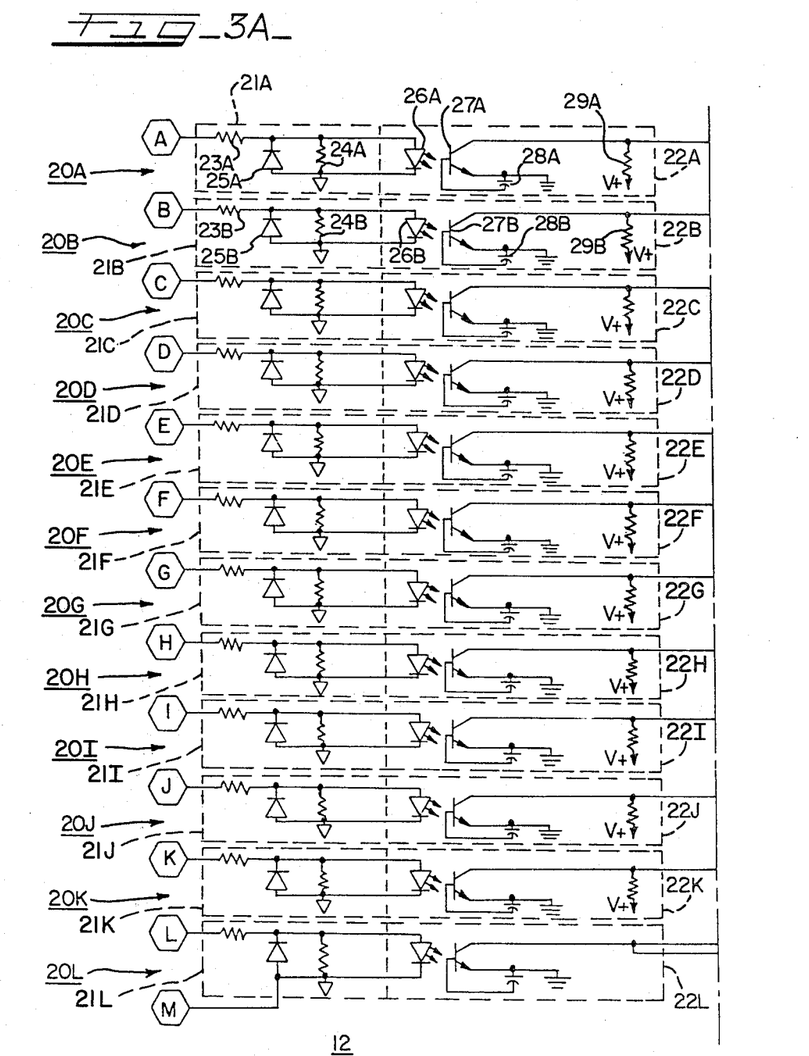
FIGS. 3a, 3b and 3c are electrical schematic diagrams, which taken together, illustrate details of the interface circuitry board of FIG. 2.

Referring now to FIG. 3a, each of isolation circuits 20A–20L includes a respective one of resistive voltage dividers 21A–21L each of which includes a pair of resistors (like resistors 23A and 24A in divider 21A) and a shunting diode (like diode 25A). Each voltage divider is connected to ground terminal M. The resistive voltage dividers 21A–21L feed current signals to twelve photocoupler circuit networks 22A–22L. The resistors in each divider control the level of the input voltage which activates the associated photocoupler network. Each shunting diode limits the reverse voltage applied to the associated photocoupler network on the negative excursions of the input signal voltage.

Each of the photocoupler networks 22A–22L includes a light emitting diode (like diode 26A), a phototransistor (like phototransistor 27A), a capacitor (like capacitor 28A) and a resistor (like resistor 29A). Each resistive voltage divider 21A–21L feeds a current signal to the input of its associated light emitting diode thereby energizing the light emitting diode. Upon energization of as LED 26, the associated phototransistor is optically coupled by the infrared light passed therebetween. A voltage isolation from the input of each isolation circuit 20A–20L to the output of the isolation circuit is thereby provided.

When a phototransistor is driven into saturation, its emitter to collector voltage is a maximum of several tenths of a volt. The capacitor, connected between the base and the emitter of the phototransistor, reduces the high frequency gain and further acts to eliminate any response that the isolation circuit has to high frequency noise or induced transients which appear on the signal line at inputs A–L. Each of the resistors (like resistor 29A) is connected between the V+ power supply and the collector of the associated phototransistor. The resistor serves as the collector load to provide a signal to the logic circuitry, which will be described in detail hereinafter.

In operation, when a line voltage signal is applied to one of the inputs A–K, the associated output transistor (like transistor 27A) turns "on" only on the positive voltage excursions and produces a nearly square wave at its collector alternating between ground (logic "0") and +6 volts. When no voltage is applied to an input A–K, the associated phototransistor will conduct, and the output signal at the collector of the phototransistor is a +6 VDC (logic "1").

While the method for isolating the input voltage described above is a preferred method for isolating the input voltage, other methods of voltage isolation can be utilized. For example, a step-down transformer or a lamp photocell-type coupler may also be utilized to provide the required isolation. Also, the value of each input resistor (like resistor 23A) may be modified so that a wide variety of input voltages may be employed.

Furthermore, a common ground connection M exists between the common input terminals of each of the photocoupler networks 22A–22L. These points could be maintained separately to permit signals with no common reference potential to be applied to the various inputs of the photocoupler networks as desired. Additionally, by eliminating the input resistor, and connecting, for example, a current transformer directly across the photocoupler network and resizing shunt resistor, a current sensing scheme can also be realized.

Figure 3B:
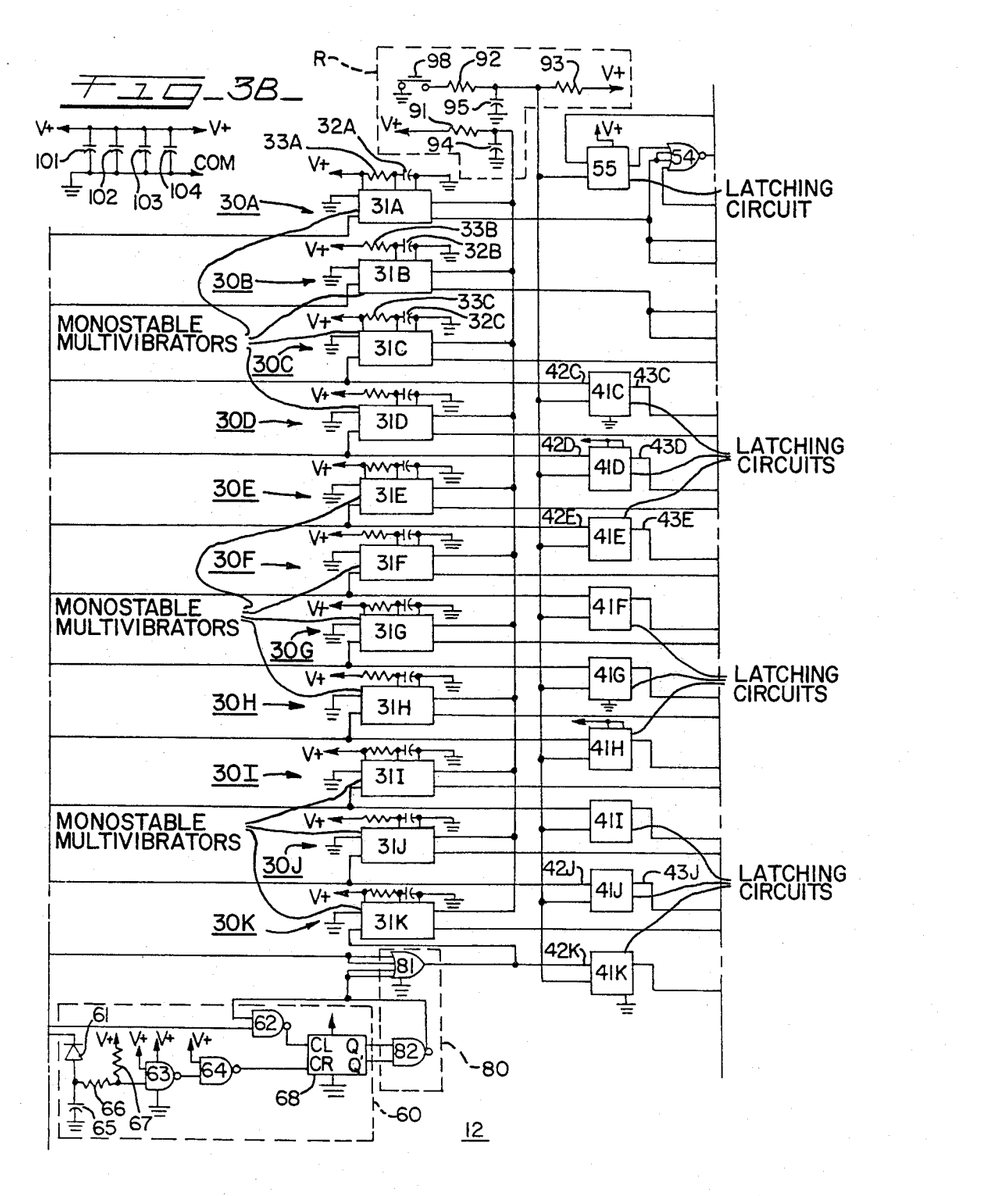

Referring to FIG. 3B, the signal generated from each photoisolator circuit 20A–20K (logic "0") is applied to a corresponding associated pulse stretching network 30A–30K which is utilized to convert the square wave generated to a +6 VDC signal (logic "1"). Each of the pulse stretching networks 30A–30K includes a respective one of eleven retriggerable monostable multi-vibrator integrated circuits 31A–31K. When a signal is received from a photoisolator circuit 20A–20K, the output of the associated pulse stretching network 30A–30K immediately transfers to a logic "1" state. The pulse stretching network will remain in the logic "1" state as long as the period of square wave triggering signal from the photoisolator circuit is less than the inherent output pulse width of the multi-vibrator.

In the present invention, the pulse width of each of the monostable multi-vibrators 31A–31K is determined by an external network including a capacitor (like capacitor 31A) and a resistor (like resistor 33A). In this embodiment, the resistor is 470K ohm and the capacitor is 0.1 Micro Farad. Thus, the output pulse width of each multi-vibrator is set for a minimum of 20 milliseconds. Since the period of the 60 Hz square wave triggering signal from a photoisolator circuit is 16.6 milliseconds, the multi-vibrator will constantly be retriggered before it is timed out. Therefore, the output of each multi-vibrator remains in its logic "1" state as long as a square wave triggering signal is received from the associated photoisolator circuit.

Figure 3C:
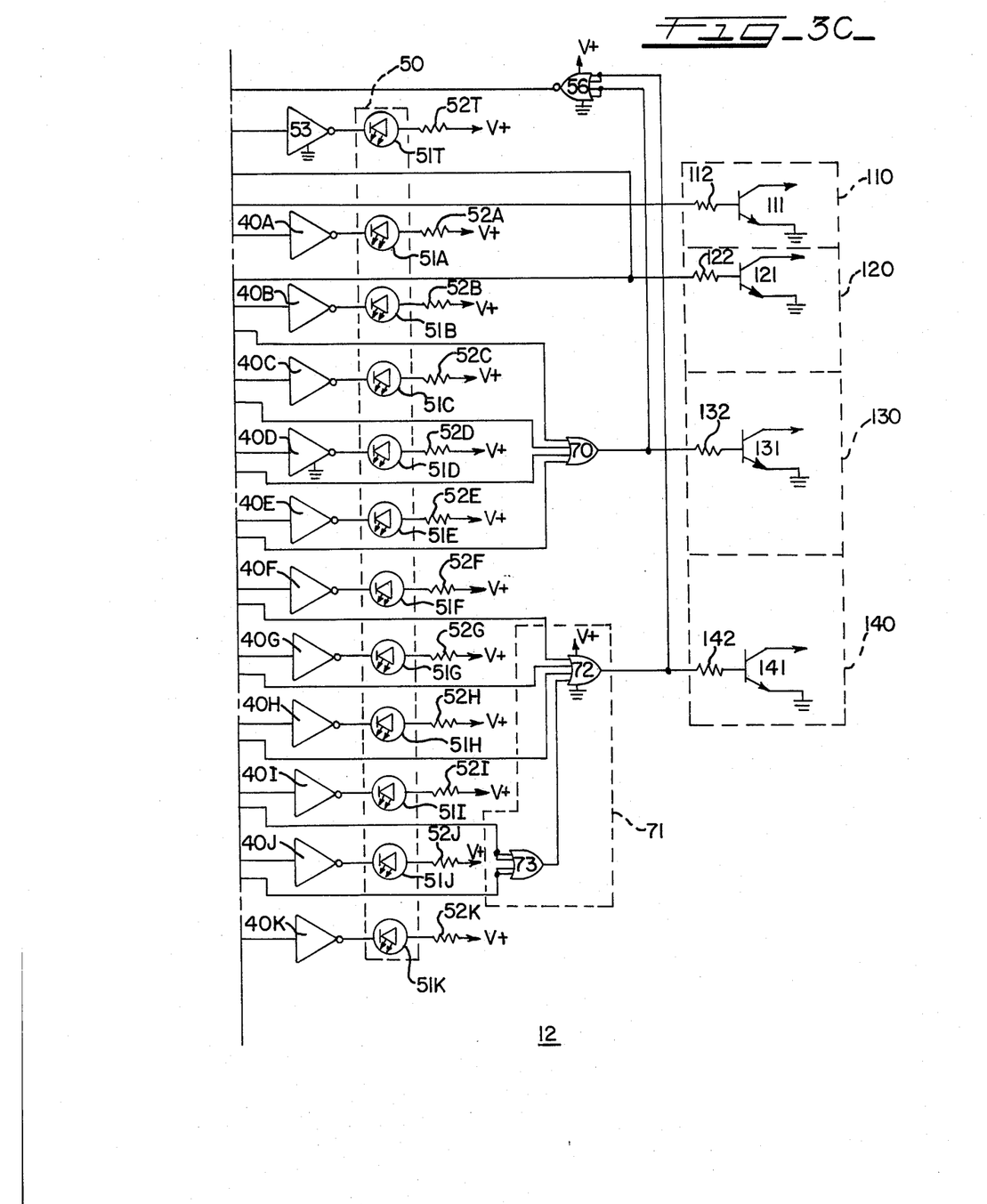

The output from each of the pulse stretching networks 30A–30K is applied to a respective one of lamp driver circuits 40A–40K, shown in FIG. 3c, which are integrated circuit amplifiers with output transistors capable of supplying the relatively large current requirements of the light emitting diodes 51A–51K. Resistors 52A–52K are utilized to energize the diodes which are located on the LED display 50.

Latching circuits 41C–41K, shown in FIG. 3b, are utilized in association with lamp driving circuitry 40C–40K to provide maintained operation of LED 51C–51K for the reasons previously discussed. Pulses generated from respective ones of the photo-isolator circuits 20C–20K are applied to respective ones of the input terminals 42C–42K of the latching circuits 41C–41K thereby causing the outputs (designated 43C–43K) of the latching circuits to transfer to a logic "1" state. The output of each the latching circuits 41C–41K will maintain the logic "1" state thereby maintaining the energization of the associated LED 51C–51K until a reset signal is manually energized by reset circuit (R).

The reset circuit (R), shown in FIG. 3b, includes an external manually operated switch 98, resistors 91, 92 and 93, capacitors 94 and 95, which are connected as shown. The reset circuit (R) is utilized to insure that the latching circuits and the pulse stretching networks are in their reset states after the +6 volts is first applied to the telemetry system. Capacitors 101, 102, 103 and 104 are adapted to be connected to the +6 VDC power supply. These capacitors act as noise bypass filters to eliminate electrical transients which may appear on the +6 VDC power supply.

The switch 98 is utilized to manually reset each latching circuit 41C–41K to the logic "0" state. The reset switch 98 is manually activated after the correction or repair of the condition that caused the original transmission.

Simultaneously with application of a signal to a latching circuit and/or a lamp driving circuit, a pulse stretching circuit also applies a signal to an associated one of output switches 110, 120, 130, and 140, depending on which input (A-K) is energized. The output switches 110, 120, 130 and 140 include transistors 111, 121, 131, and 141 and resistors 112, 122, 132, and 142, respectively, as shown in FIG. 3C.

When input A of the interface circuitry board 12 is energized, the pulse stretching network 30A passes a signal directly to output switch 110. Similarly, when input B of the interface circuitry board 12 is energized, the pulse stretching circuit 30B transmits a signal directly to output switch 120. However, when either input C, D, E or F is energized, the associated one of pulse stretching networks 30C-30F generates a signal which passes to a 4-input OR gate 70. The signal is then passed from gate 70 to output switch 130. Similarly, when either input G, H, I, J or K is energized, the associated one of the pulse stretching networks 30G-30K passes a signal to a five-input OR gate network 71 which includes OR gates 72 and 73. The signal from network 71 is then transmitted to output switch 140.

Transistors 111, 121, 131, and 141 are utilized as saturating switches for each output switch 110, 120, 130 and 140, respectively, in the grounded emitter configuration as shown. Resistors 112, 122, 132 and 142 are utilized to control the drive current applied to the base of the transistors 111, 121, 131 and 141 to insure saturation. Upon saturation of the transistor, an output Z, Y, X and W is generated from the output switch 110, 120, 130 or 140, respectively, and corresponding code Z, code Y, code X or code W signal is transmitted from the interface circuitry board 12 to the transmitter unit 18, shown in FIG. 1.

As previously stated, when inputs G-J are energized, output switch 140 is energized in a similar manner. However, when input K is energized output switch 140 is energized in a slightly different manner. When a voltage is applied to input K, output switch 140 will not be energized until input L has been energized for a period of 102 seconds. Referring to FIG. 3b, a timer circuit 60 and logic gate network 80 is utilized to provide the 102 second time delay. The circuit 60 includes three NAND Schmitt trigger gates 62, 63, and 64 and a 14-stage binary counter 68 of complimentary MOS construction. The logic gate network 80 includes OR gate 81 and NAND gate 82.

When input K is energized, photoisolator circuit 20K will generate a logic "0" signal which will be applied to OR gate 81. Since the normal output of NAND gate 82 is a logical "1" gate 81 will transmit a logic "1" signal. However, a logic "0" signal from gate 81 is required to energize pulse stretching network 30K. When gate 82 has a logic "0" signal output, which is applied to gate 81, gate 81 will transmit the logic "0" signal required to energize the pulse stretching network 30K for further transmission to output switch 140.

When a voltage is applied to input L, the isolation circuit 20L similarly generates the square wave output which is applied to gate 62. The output of gate 62 is used as a clocking input (CL) to the counter 68. Diode 61, capacitor 65, and resistors 66, 67 comprise a negative peak detecting circuit to provide a logic "0" DC level input to gate 63. The input signal to gate 63 is inverted twice by gates 63 and 64 and is then used as a control signal for the counter reset terminal (CR) of the counter 68.

A logic "0" signal on the counter reset terminal (CR) allows the binary counter 68 to begin counting the output pulses of the photoisolator circuit 20L which occur at the 60 Hz power line frequency. The outputs Q and Q', which correspond to stages 12 and 13 of the counter 68 are connected to the NAND gate 82 whose output is normally a logic "1". At the end of 6,144 ($=2048+4096=2^{12}+2^{13}$) input pulses, which is equal to 102.4 seconds, outputs Q and Q' are both at logic "1" levels. At this instant the output of gate 82 becomes a logic "0". This output is transmitted to the input of gate 62 to inhibit gate 62 from transmitting any further clock pulses to the counter 68 thereby holding the counter 68 in this state. The output from gate 82 is simultaneously transmitted to the input of OR gate 81 thereby allowing energization of pulse stretching network 30K upon occurrence of the condition associated with input K.

When input L is de-activated, capacitor 65 is charged through resistor 67. As the capacitor voltage rises through the voltage threshold of gate 63, gates 63 and 64 operate to provide a logic "1" signal to the counter reset terminal (CR) of the counter 68. All the counter outputs are now logic "0" and the output of gate 82 is again a logic "1". This output of gate 82 is applied to the input of OR gate 81 to prevent transmission of an input K signal as previously discussed.

Referring to FIGS. 3a, 3b and 3c, the operation of the entire interface circuitry board 12 can be better understood by illustrating the operation of the circuitry upon application of a signal to each of the respective inputs A through L. It should be understood that prior to applying any input signals, it is assumed that +6V bias voltage has been applied. Further, it is assumed that the latching circuits 41C-41K and 55, the pulse stretching networks 30A-30K and the timer circuit 60 have been reset. Further, all inputs to the gates 54, 56, 70, 72 and 73 are all in the logic "0" state. Thus, the output of the gate 54, in conjunction with inverting lamp driver 53 and resistor 52T, causes the green LED 51T to be energized. The green LED 51T indicates optimum operation of the water chilling system. At this time, all other 1ED indicators 51A-51K should be deenergized.

When a signal is applied to input A, photoisolator circuit 20A energizes the pulse stretching network 30A so that the output of the pulse stretching circuit 30A is a logic "1". This output is applied to the lamp driver circuit 40A thereby energizing the momentary red LED 51A. Output switch 110 is also activated and a Z output is passed to the telemetry transmitter 18 for further transmission. The logic "1" signal at the input of the gate 54 thereby de-energizes the green LED 51T. Removal of the input signal from input A results in the de-energization of red LED 51A, energization of the green LED 51T, and the de-activation output switch 110.

Similarly, when a signal is applied to input B, the interface circuitry board 12 operates in an identical manner as it did when input A energized except that, when input B is energized, photoisolator circuit 20B and pulse stretching network 30B are utilized. Furthermore, LED 51B is energized and the output switch 120 is activated thereby generating a Y output to be transmitted to the transmitter 18. Again, when the signal is removed from input B, output switch 120 is deactivated, the red LED indicator 51B is extinguished and the green LED indicator 51T is energized.

When a signal is applied to inputs C, D, E, and F, photo-isolator circuits 20C, 20D, 20E, or 20F, respectively, and the corresponding pulse stretching network 30C, 30D, 30E or 30F, are energized. The associated latching circuit 41C, 41D, 41E or 41F is then energized. A signal will then be transmitted to lamp driver 40C, 40D, 40E or 40F to energize the yellow LED 51C, 51D, 51E or 51F, respectively. The logic "1" signal from the pulse stretching circuitry 30C, 30D, 30E or 30F is applied to gate 70 so that the output of the gate 70 is a logic "1" signal. This signal in turn activates the output switch 130 thereby generating an output X to the transmitter 18. The logic "1" output signal from the gate 70 also activates gate 56, latch 55, gate 54, lamp driver 53, to extinguish the green LED 51T.

When this input C, D, E, or F is removed, the output of the pulse stretching circuitry 30C, 30D, 30E or 30F returns to a logic "0" level and thereby de-energizes the output switch 130. The latching circuit 41C, 41D, 41E or 41F remains in the logic "1" state causing the yellow LED to remain energized. The latching circuit 55 causes the green LED 51T to remain extinguished.

Upon manual activation of the reset switch 98, the latching circuitry 41C, 41D, 41E or 41F will be reset thereby extinguishing the yellow LED 51C, 51D, 51E or 51F. Latch 55 will also thereby be reset to allow the green LED 51T to be again energized.

When a signal is applied to input G, H, I, J or K, the interface circuitry board 12 will respond in a manner similar to that described with regard to inputs C, D, E or F except that the signal from pulse stretching network 30G, 30H, 30I, 30J or 30K will be passed to the five input gate network 71 to thereby activate output switch 140 and generate a W output to the transmitter 18. As previously discussed, the pulse stretching network 30K cannot be energized until input L has been energized for a minimum of 102 seconds. After the 102 second delay, gate 81 will be in a state to allow energization of pulse stretching network 30K, upon receipt of a signal from the photoisolator circuit 20K. The pulse stretching network 30K will then transmit a signal to output switch 140 to transmit an output W to the transmitter 18.

Similarly, with inputs G, H, I, J and K, the yellow LED indicators 51G, 51H, 51I, 51J or 51K will remain energized through latching circuitry 41G, 41H, 41I, 41J or 41K, respectively. The green LED 51T will similarly be de-energized in conjunction with latching circuit 55. Upon manual activation of reset switch 98, the latching circuits 41G, 41H, 41I, 41J or 41K and 55 will be reset thereby de-energizing the yellow LED indicator 51G, 51H, 51I, 51J or 51K, and energizing the green LED 51T to again indicate optimum performance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A telemetry system for reporting the status of one or more parameters being monitored in an operative system to a remote station comprising:
   means for generating an electrical signal in response to the occurrence of a preselected physical parameter in the operative system,
   interface circuit means having input means for receiving said electrical signal,
   transmitter means connected to said interface circuit means for selectively transmitting a coded message to a remote location,
   said interface circuit means acting to produce a transmitter input signal in response to said electrical signal,
   said transmitter means having a transmitter input for receiving said transmitter input signal,
   said transmitter means being responsive to said transmitter input signal to automatically dial a pre-programmed telephone number at the remote location and transmit a coded message thereto to report the status of the preselected physical parameter,
   said interface circuit means having isolation means to isolate said electrical signal applied thereto to generate a triggering signal,
   said interface circuit means further including means responsive to said triggering signal to provide said transmitter input signal, and
   indicating means coupled to said interface circuit means to indicate the occurrence of said preselected physical parameter.

2. The telemetry system according to claim 1 and including means for providing a plurality of separate electrical signals each of which is produced in response to the occurrence of a respective one of a plurality of pre-selected parameters being monitored in the operative system.

3. The telemetry system according to claim 2 and including a plurality of contacts each of which is caused to close to produce an electrical signal in response to the occurrence of a respective preselected physical parameter in the operative system.

4. The telemetry system according to claim 2 wherein said input means of said interface circuit means includes a plurality of inputs, each of said contacts being coupled to a respective one of said inputs in order to apply to each input the electrical signal controlled by the associated contact.

5. The telemetry system according to claim 4 wherein said interface circuit means produces a plurality of separate transmitter input signals in response to said plurality of electrical signals applied to said inputs of said interface circuit means.

6. The telemetry system according to claim 5 wherein the number of said plurality of inputs of said interface circuit means is greater than said plurality of separate transmitter input signals.

7. The telemetry system according to claim 5 wherein said transmitter means generates a distinguishable coded message in response to each of said plurality of transmitter input signals.

8. The telemetry system according to claim 7 wherein said interface circuit means produces selected ones of at least four separate transmitter input signals.

9. The telemetry system according to claim 7 wherein the number of inputs of said interface circuit means is greater than four.

10. The telemetry system according to claim 5 wherein said interface circuit means includes means to multiplex any of the electrical signals applied to at least one group of said plurality of inputs of said interface circuit means.

11. The telemetry system according to claim 1 wherein said isolation means further includes phototransistor means.

12. A telemetry system for reporting to a remote location the status of a plurality of safety and anticipatory controls of a cooling system comprising:

means for generating one or more electrical signals in response to the activation of safety controls monitoring selected parameters of the cooling system and effecting shut-down thereof, means for generating one or more additional electrical signals in response to the activation of anticipatory controls indicating abnormal physical conditions existing in the cooling system prior to shut-down by a safety control, interface circuit means having at least a first input for receiving said one or more electrical signals and at least a second input for receiving said one or more additional electrical signals, transmitter means connected to said interface circuit means for selectively transmitting coded messages to a remote location, said interface circuit means acting to produce at least one safety transmitter input signal in response to said one or more electrical signals and at least one anticipatory transmitter input signal in response to said one or more additional electrical signals, said transmitter means having a first input means to receive said at least one safety transmitter input signal and a second transmitter input means for receiving said at least one anticipatory transmitter input signal, said transmitter means being responsive to said safety transmitter input signal to transmit at least one coded message to a remote location identifying activation of the safety control, and said transmitter means being responsive to said anticipatory transmitter input signal to transmit at least one anticipatory coded message to a remote location identifying activation of the anticipatory control.

13. The telemetry system according to claim 12 wherein said means for generating one or more additional electrical signals produces respective ones of a plurality of additional electrical signals in response to activation of respective ones of a plurality of anticipatory controls monitoring different conditions in the operative system, and said interface circuit means having a plurality of second inputs to receive said additional electrical signals and acting to produce at least one anticipatory transmitter input signal in response to receiving one or more of said plurality of additional electrical signals.

14. The telemetry system according to claim 12 wherein said interface circuit means includes means to isolate said one or more electrical signals and said one or more additional electrical signals and means to generate one or more triggering signals, said interface circuit means further including means responsive to said one or more triggering signals to provide said at least one safety transmitter input signal or said at least one anticipatory transmitter input.

15. The telemetry system according to claim 14 wherein said interface circuit means includes multiplexing means to multiplex any of said additional electrical signals applied to at least one group of said plurality of second inputs of said interface circuit means.

16. The telemetry system according to claim 15 further including indicator means coupled to said interface circuit means to indicate the occurrence of said selected physical parameter or one or more of said abnormal conditions.

17. The telemetry system according to claim 12 wherein said means for generating an electrical signal includes an electrical contact which is closed in response to activation of the safety control, and wherein said means for generating an additional electrical signal includes an electrical contract which is closed in response to activation of the anticipatory control.

* * * * *